(12) United States Patent  (10) Patent No.: US 8,786,931 B2
Fukushima et al.  (45) Date of Patent: Jul. 22, 2014

(54) ELECTROCHROMIC DISPLAY

(71) Applicant: Stanley Electric Co., Ltd., Tokyo (JP)

(72) Inventors: Hiroto Fukushima, Yokohama (JP);
Yoshihisa Iwamoto, Yokohama (JP);
Yasuo Toko, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/802,643

(22) Filed: Mar. 13, 2013

(65) Prior Publication Data
US 2013/0242369 A1    Sep. 19, 2013

(30) Foreign Application Priority Data

Mar. 14, 2012 (JP) ................................. 2012-056834

(51) Int. Cl.
*G02F 1/153* (2006.01)
(52) U.S. Cl.
USPC .......................................................... 359/267
(58) Field of Classification Search
USPC .......................................................... 359/267
See application file for complete search history.

(56) References Cited

U.S. PATENT DOCUMENTS 4,505,021 A      3/1985  Hamada et al.
2011/0279884 A1* 11/2011 Fujimura et al. ............. 359/270

FOREIGN PATENT DOCUMENTS

JP    58-70272 A    4/1983

\* cited by examiner

*Primary Examiner* — James Jones
(74) *Attorney, Agent, or Firm* — Holtz Holtz Goodman & Chick PC

(57) ABSTRACT

There is provided an electrochromic display that includes a display substrate, which includes a display electrode on a first substrate and an insulating film on or above the display electrode; a counter substrate having a counter electrode on a second substrate, the counter substrate facing the display substrate; and a color-developing layer containing an electrochromic material disposed in a region surrounded by a sealing member between the display substrate and the counter substrate. The insulating film is disposed on or above the display electrode except for a display region of the display electrode in the region surrounded by the sealing member.

5 Claims, 3 Drawing Sheets

US 8,786,931 B2

ELECTROCHROMIC DISPLAY

CROSS-REFERENCE TO RELATED APPLICATION

This application is based upon and claims the benefit of priority of the prior Japanese Patent Application No. JP 2012-056834, filed on Mar. 14, 2012, the entire contents of which are incorporated herein by reference.

BACKGROUND OF THE INVENTION

A) Field of the Invention

The present invention relates to an electrochromic display (ECD).

B) Description of the Related Art

One known non-emissive display that utilizes a color change phenomenon of a substance due to an electrochemical reversible reaction (an electrolytic oxidation-reduction reaction) caused by the application of a voltage is an electrochromic display (see, for example, Japanese Examined Patent Application Publication No. 1-28927).

Since an electrochromic display is driven by a current, the electric wiring (lead wire) resistance of the electrochromic display should be reduced. For example, in the display of characters, a higher lead resistance of a display electrode can result in lower contrast (a lower color density) and a higher driving voltage of a more distant pixel.

In order to reduce lead resistance, a lead wire for a display electrode may have a large width but should be designed so as not to interfere (overlap) with a lead wire for a counter electrode. Thus, the width of the lead wire for a display electrode is limited. More specifically, when lead wires for a display electrode and a counter electrode intersect on a cell surface, the intersection also acts as a pixel and causes misregistration.

A lead wire may be made of a material having a low specific resistance. However, in an electrochromic display, an electrode disposed on at least one side of its substrate must be made of a transparent electroconductive material, such as ITO. It is therefore difficult to prevent adverse effects of distant pixels on display images.

In electrochromic displays, edges of pixels (edges of electrodes) generally tend to become darker in color. In particular, this results in variations in the display of characters and low display quality. Variations in the display of characters are particularly noticeable in pixels having a large display area.

The invention according to Japanese Examined Patent Application Publication No. 1-28927 can be applied to electrochromic displays that cause coloration and decoloration of an interfacial film but cannot be applied to electrochromic displays that cause coloration and decoloration in the bulk. Furthermore, because of difficulty in patterning a second electrode, only static driving is possible (duty driving is impossible).

SUMMARY OF THE INVENTION

It is an object of the present invention to provide an electrochromic display that can produce high-quality images.

In accordance with one aspect of the present invention, an electrochromic display includes a display substrate, which includes at least one display electrode on a first substrate and an insulating film on or above the at least one display electrode; a counter substrate having a counter electrode on a second substrate, the counter substrate facing the display substrate; and a color-developing layer containing an electrochromic material disposed in a region surrounded by a sealing member between the display substrate and the counter substrate, wherein the insulating film is disposed on or above the at least one display electrode except for a display region of the display electrode in the region surrounded by the sealing member.

The present invention can provide an electrochromic display that can produce high-quality images.

DESCRIPTION OF EMBODIMENTS

FIGS. 1A to 1D are schematic views illustrating a method for manufacturing an electrochromic display according to a first embodiment. The first embodiment is a bulk-type electrochromic display.

Figure 1A:
FIGS. 1A to 1D are schematic views illustrating a method for manufacturing an electrochromic display according to a first embodiment.

As illustrated in FIG. 1A, a pair of glass substrates (transparent substrates) 51a and 51b were prepared. ITO films 52a and 52b were disposed on the glass substrates 51a and 51b, respectively.

Figure 1B:
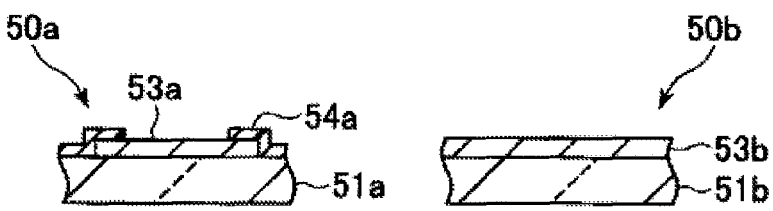

As illustrated in FIG. 1B, the ITO films 52a and 52b were patterned by a photolithography process to form a display electrode 53a and a counter electrode 53b, respectively, on the glass substrates 51a and 51b. The display electrode 53a and the counter electrode 53b were made of ITO (a transparent electroconductive material).

Preferably, the ITO films 52a and 52b are patterned such that most of the ITO films 52a and 52b remain. Only a duty region may be taken into consideration, and it is not necessary to consider the interference of lead wires. Etching was performed using an aqueous solution of an aqua regia mixed acid. The etchant may be iron (III) oxide. The ITO films 52a and 52b may be patterned by laser ablation.

Although the transparent electrodes 53a and 53b were formed on the transparent substrates 51a and 51b in the present embodiment, one of the substrates 51a and 51b may be an opaque substrate, and an electrode on the opaque substrate may be opaque. An opaque electrode may be made of a silver alloy, gold, copper, aluminum, nickel, or molybdenum. The transparent electrodes 53a and 53b may be made of a transparent electroconductive material other than ITO.

A $SiO_2$ film 54a having a thickness in the range of 3000 to 4000 angstroms was then formed on a portion of the display electrode 53a as an insulating film. The $SiO_2$ film 54a may have another thickness. The $SiO_2$ film 54a may be formed by magnetron sputtering and may be patterned using a SUS mask. The $SiO_2$ film 54a may be patterned by a lift-off method or a photolithography process. In this case, wet etching conditions or dry etching conditions that do not cause damage to the ITO electrode 53a are employed.

It is desirable that the $SiO_2$ film 54a be also formed in a region of the glass substrate 51a in which the display electrode 53a is not disposed, at least a region of the glass substrate 51a in which the display electrode 53a is not disposed in a display region of a manufactured electrochromic display surrounded by a sealing member. The $SiO_2$ film 54a was not formed on a lead terminal of the display electrode 53a.

Thus, the glass substrate 51a, the display electrode 53a disposed on the glass substrate 51a, and the SiO$_2$ film 54a disposed on at least a portion of the display electrode 53a constitute a display substrate 50a. The glass substrate 51b and the counter electrode 53b disposed on the glass substrate 51b constitute a counter substrate 50b.

Figure 1C:
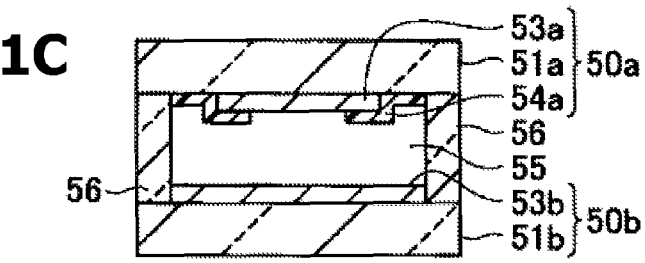

As illustrated in FIG. 1C, for example, 1 to 5 particles/mm$^2$ of a gap control agent having a diameter in the range of 20 μm to several hundreds of micrometers, for example, 50 μm, is sprayed on one of the display substrate 50a and the counter substrate 50b. Depending on the diameter of the gap control agent, it is desirable to control the amount of gap control agent so as not to adversely affect display images. Since minor variations in gap do not have significant influence on electrochromic display images, the amount of gap control agent is not important. Although the gap control was performed using the gap control agent in the present embodiment, the gap control may be performed using a rib.

A main seal pattern was formed on the other of the display substrate 50a and the counter substrate 50b. A sealing member 56 of a ultraviolet light+heat curing type was used. The sealing member may be of a photo-curing type or a heat curing type.

A proper amount of electrolyte solution containing an electrochromic material was dropped on one side of each of the display substrate 50a and the counter substrate 50b by an ODF process. The electrolyte solution may be dropped by one of various printing methods, including by using a dispenser or by ink jet printing. In the present embodiment, a proper amount of electrolyte solution containing an electrochromic material was dropped with a dispenser. Thus, the sealing member is preferably made of a sealing material that is resistant to the electrolyte solution (a sealing member that has corrosion resistance).

The display substrate 50a was placed on the counter substrate 50b in a vacuum. The display substrate 50a may be placed on the counter substrate 50b in the atmosphere or in a nitrogen atmosphere.

The sealing member 56 was cured by ultraviolet light irradiation, for example, at an energy density of 21 J/cm$^2$. Only the sealing member 56 was irradiated with ultraviolet light using a SUS mask.

The electrolyte solution containing an electrochromic material contains an electrochromic compound material, a supporting electrolyte, and a solvent. Examples of the electrochromic compound material include materials containing at least one of dimethyl terephthalate, 4,4'-biphenyldicarboxylic acid diethyl ester, diacetylbenzenes (such as 1,4-diacetylbenzene), viologens (such as N,N'-dimethylviologen and 1,4-diheptylviologen), poly(3,4-ethylenedioxythiophene), polyaniline, and phenanthroline complexes. Examples of inorganic electrochromic materials include transition metal oxides, such as iridium hydroxide support titanium oxide, and metal hydroxides, such as iridium hydroxide. The electrochromic material may be any compound that can undergo a reversible color change in an electrochemical oxidation-reduction reaction.

Examples of the supporting electrolyte include lithium salts (such as LiCl, LiBr, LiI, LiBF$_4$, and LiClO$_4$), potassium salts (such as KCl, KBr, and KI), and sodium salts (such as NaCl, NaBr, and NaI). The supporting electrolyte may be any substance that can promote an oxidation-reduction reaction of a color-developing material. The concentration of the supporting electrolyte is preferably, but is not limited to, 10 mM or more and 1 M or less.

Examples of the solvent include polar solvents, such as water, nonpolar organic solvents, ionic liquids, ion conductive polymers, and polyelectrolytes. More specifically, examples of the solvent include propylene carbonate, dimethyl sulfoxide, N,N-dimethylformamide, tetrahydrofuran, acetonitrile, polyvinyl sulfate, polystyrene sulfonate, and polyacrylic acid. The solvent is not limited to these and may be any solvent that can stably hold the color-developing material.

FIG. 1C is a schematic cross-sectional view of the electrochromic display according to the first embodiment. The electrochromic display according to the first embodiment includes the display substrate 50a and the counter substrate 50b, which are parallel to each other, and a color-developing layer 55 disposed between the substrates 50a and 50b.

The display substrate 50a includes the glass substrate 51a, the display electrode 53a disposed on the glass substrate 51a, and the SiO$_2$ film (insulating film) 54a disposed on at least a portion of the display electrode 53a. In the present embodiment, the SiO$_2$ film 54a is also disposed in a region of the glass substrate 51a in which the display electrode 53a is not disposed in a region surrounded by the sealing member 56.

The counter substrate 50b includes the glass substrate 51b and the counter electrode 53b disposed on the glass substrate 51b.

The color-developing layer 55 contains an electrolyte solution containing an electrochromic material and is disposed in the region surrounded by the sealing member 56 between the display substrate 50a and the counter substrate 50b. Upon the application of a voltage between the substrates 50a and 50b (the display electrode 53a and the counter electrode 53b), the color-developing layer 55 develops a color on the side of the display substrate 50a (the display electrode 53a).

Figure 1D:
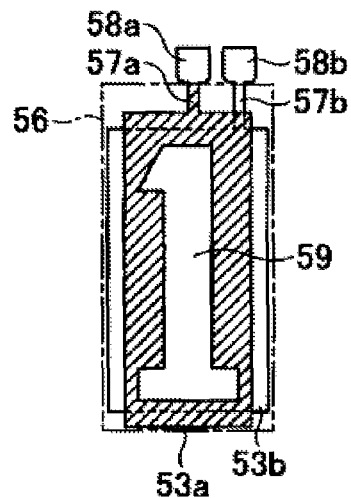

FIG. 1D is a schematic plan view illustrating the electrode patterns of the display electrode 53a and the counter electrode 53b and the pattern of the SiO$_2$ film (insulating film) 54a on the display electrode 53a. The SiO$_2$ film 54a on the display electrode 53a is indicated by oblique lines.

The display electrode 53a includes a lead terminal 58a and a plain electrode electrically connected to the lead terminal 58a through a lead wire 57a. The sealing member 56 is indicated by an alternate long and short dashed line. The lead wire 57a and the plain electrode are disposed within the region surrounded by the sealing member 56, and the lead terminal 58a is disposed on the outside of the region surrounded by the sealing member 56.

A display region 59 on the display electrode 53a has a letter (numeric character) "1". A portion of the display electrode 53a other than the display region 59 and the lead terminal 58a is covered with the SiO$_2$ film 54a. Thus, the display electrode 53a except for the display region 59 in the region surrounded by the sealing member 56 is covered with the SiO$_2$ film 54a. In other words, the display region 59 is decided as non-formed region of the SiO$_2$ film 54a on the display electrode 53a in the region surrounded by the sealing member 56. The display region 59 has the shape of an image to be displayed. More specifically, the electrochromic display according to the first embodiment displays a character "1".

The counter electrode 53b includes a lead terminal 58b and a plain electrode electrically connected to the lead terminal 58b through a lead wire 57b. The lead wire 57b and the plain electrode are disposed within the region surrounded by the sealing member 56, and the lead terminal 58b is disposed on the outside of the region surrounded by the sealing member 56. As viewed from the top (as viewed in the direction of a normal line of the display substrate 50a and the counter substrate 50b), the display region 59 of the display electrode 53a faces the plain electrode of the counter electrode 53b. No insulating film is formed on the counter electrode 53b.

An insulating film, such as a $SiO_2$ film, may be disposed on the counter electrode 53b in the region surrounded by the sealing member 56. In this case, as viewed from the top, the insulating film should not face the display region 59 of the display electrode 53a. For example, the insulating film may cover the entire portion of the counter electrode 53b that does not face the display region 59 in the region surrounded by the sealing member 56.

Upon the application of a voltage between the display substrate 50a and the counter substrate 50b (the display electrode 53a and the counter electrode 53b), the electrochromic display according to the first embodiment can display the letter (numeric character) "1" due to the color development of the color-developing layer 55.

The present inventors checked the display performance of the electrochromic display according to the first embodiment. The display region 59 developed colors, but the other region (a region covered with the $SiO_2$ film 54a) did not develop colors. Uneven color development was not observed in the vicinity of the edge of the display region 59 (in the vicinity of the boundary between the region covered with the $SiO_2$ film 54a and the region not covered with the $SiO_2$ film 54a). Variations in color density were also not observed in the display region 59. Thus, a high-quality display of "1" was achieved without variations in the display of characters. The electrochromic display according to the first embodiment includes a non-display region and a display region corresponding to regions on which the $SiO_2$ film (insulating film) 54a is formed and not formed, respectively, and can produce high-quality images.

An electrochromic display according to a second embodiment will be described below. The first embodiment employs the $SiO_2$ film as the insulating film. The second embodiment employs an organic insulating film. More specifically, an acrylic insulating material was used to form an organic insulating film in the region in which the $SiO_2$ film was disposed in the first embodiment.

More specifically, an organic insulating film having a thickness of 1.8 μm was formed by spin coating at 2000 rpm for 30 seconds, was prebaked on a hot plate (at 100° C. for 120 seconds), was exposed (at an illuminance of 5.79 mW/cm² for 5 seconds, 5.79×5=28.95 mJ/cm²), was developed (shower development with 1% TMAH solution for 60 seconds), and was finally post-baked (at 220° C. for 30 minutes) to form an insulating film pattern.

The present inventors checked the display performance of the electrochromic display according to the second embodiment and found that the display region 59 developed colors but the other region (a region covered with the organic insulating film) did not develop colors, as in the first embodiment. Uneven color development was not observed in the vicinity of the edge of the display region 59 (in the vicinity of the boundary between the region covered with the organic insulating film and the region not covered with the organic insulating film). Variations in color density were also not observed in the display region 59. The electrochromic display according to the second embodiment includes a non-display region and a display region corresponding to regions on which the organic insulating film is formed and not formed, respectively, and can produce high-quality images.

The $SiO_2$ film in the first embodiment and the organic insulating film in the second embodiment may be dispose on regions of the glass substrates 51a and 51b to be covered with the main seal 56. There were no problems with adhesion and other characteristics.

FIGS. 2A to 2D are schematic views illustrating a method for manufacturing an electrochromic display according to a third embodiment. The first and second embodiments are bulk-type electrochromic displays. The third embodiment is an interface-type electrochromic display.

Figure 2A:
FIGS. 2A to 2D are schematic views illustrating a method for manufacturing an electrochromic display according to a third embodiment.

As illustrated in FIG. 2A, a pair of glass substrates (transparent substrates) 51a and 51b were prepared. ITO films 52a and 52b were disposed on the glass substrates 51a and 51b, respectively.

Figure 2B:
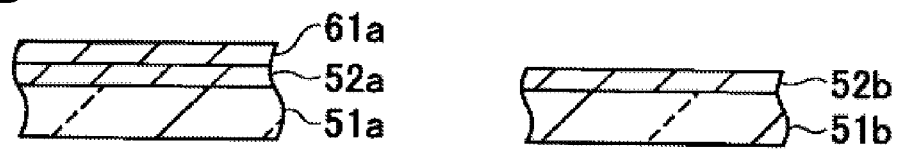

As illustrated in FIG. 2B, an electrochromic layer 61a was formed on the ITO film 52a. The electrochromic layer 61a was a tungsten trioxide ($WO_3$) film (transparent film) formed by vacuum evaporation. The electrochromic layer 61a may be a molybdenum oxide film, a tungsten-molybdenum oxide composite film, a vanadium oxide film, an iridium oxide film, a manganese dioxide film, or a nickel oxide film. The electrochromic layer 61a may be made of an organic material, such as a viologen compound or a styryl compound. The electrochromic layer 61a may be any electrochromic material film that allows switching between the transparent state and the colored state. The electrochromic layer 61a may be formed by sputtering (RF magnetron sputtering), plating, a LB method, or a printing method (such as screen printing, spin coating, or die coating), as well as vacuum evaporation.

It is desirable that the electrochromic layer 61a have an amorphous structure having many gaps therein rather than a dense film structure. In order to form many gaps, fine particles may be dispersed. After the $WO_3$ film was formed, heat treatment was performed at 350° C. for 30 minutes.

Figure 2C:
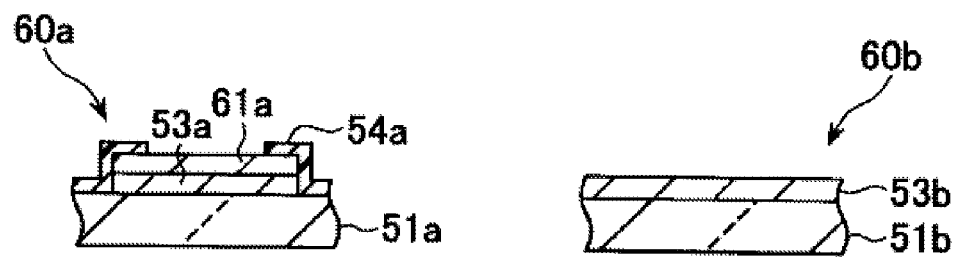

As illustrated in FIG. 2C, portions of the ITO film 52a and the electrochromic layer 61a were removed, and the display electrode 53a and the electrochromic layer 61a were patterned. The portions of the ITO film 52a and the electrochromic layer 61a were removed by $Nd:YVO_4$ laser (having a wavelength of 1064 nm) irradiation. Another laser, such as a Nd:YAG laser or a Nd:YLF laser, may be used. The portions of the ITO film 52a and the electrochromic layer 61a irradiated with a laser beam were removed by ablation and evaporation by heat.

An $YVO_4$ laser having a maximum output of 10 W was used. The portions of the ITO film 52a and the electrochromic layer 61a were irradiated with a laser beam at an output in the range of 1% to 100%, for example, 75% (7.5 W), at an oscillation frequency in the range of 10 to 100 kHz, for example, 50 kHz, at a scan speed in the range of 1 to 1500 mm/s, for example, 500 mm/s on a surface to be irradiated with the laser beam.

The present inventors observed that the portions of the ITO film 52a and the electrochromic layer 61a irradiated with the laser beam were completely removed to expose a surface of the glass substrate 51a. The exposed surface of the glass substrate 51a had a surface roughness of approximately 80 angstroms. This surface roughness is substantially the same as the surface roughness of the ITO film 52a, indicating that the surface of the glass substrate 51a has sufficient smoothness. The $YVO_4$ laser can be absorbed by the ITO film 52a but is negligibly absorbed by the glass substrate 51a. Because of its wavelength, the $YVO_4$ laser generates little heat and can decompose and remove ITO at the atomic level mainly by ablation. Thus, it is supposed that the $YVO_4$ laser causes little damage to the glass substrate 51a.

The present inventors also observed that the display electrode 53a and the electrochromic layer 61a were transparent at the boundary between the region irradiated with the laser beam (the exposed surface of the glass substrate 51a) and the non-irradiated region (the residual region of the display electrode 53a and the electrochromic layer 61a).

A $SiO_2$ film 54a having a thickness in the range of 3000 to 4000 angstroms was formed as an insulating film on a portion of the layered structure of the display electrode 53a and the electrochromic layer 61a. The SiO₂ film 54a may have another thickness. The SiO₂ film 54a may be formed by magnetron sputtering and may be patterned using a SUS mask. The SiO₂ film 54a may be patterned by a lift-off method. The SiO₂ film 54a may be patterned by a photolithography process. In this case, wet etching conditions or dry etching conditions that do not cause damage to the ITO electrode 53a and the electrochromic layer 61a are employed.

It is desirable that the SiO₂ film 54a be also formed in a region of the glass substrate 51a in which the display electrode 53a and the electrochromic layer 61a are not disposed, at least a region of the glass substrate 51a in which the display electrode 53a and the electrochromic layer 61a are not disposed in a display region of a manufactured electrochromic display surrounded by a sealing member. The SiO₂ film 54a was not formed on a lead terminal of the display electrode 53a.

The ITO film 52b on the glass substrate 51b was patterned by a photolithography process to form the counter electrode 53b. The counter electrode 53b may be covered with an electron donation film.

Thus, the glass substrate 51a, the display electrode 53a disposed on the glass substrate 51a, the electrochromic layer 61a disposed on the display electrode 53a, and the SiO₂ film 54a disposed on at least a portion of the layered structure of the display electrode 53a and the electrochromic layer 61a constitute a display substrate 60a. The glass substrate 51b and the counter electrode 53b disposed on the glass substrate 51b constitute a counter substrate 60b.

Figure 2D:
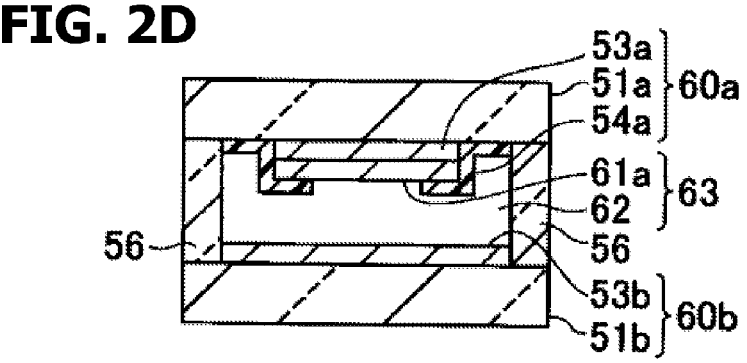

As illustrated in FIG. 2D, a main seal pattern was formed on the counter substrate 60b using a main sealing member 56 containing 2% to 5% by weight of a gap control agent, for example, by screen printing or with a dispenser. The gap control agent had a predetermined diameter such that an electrolyte solution layer of a manufactured electrochromic display had a thickness in the range of 50 to 200 μm, for example. The gap control agent contained plastic balls having a diameter of 75 μm, and the electrolyte solution layer had a thickness of 75 μm. 5% by weight of the plastic balls were added to a sealing member that was resistant to the electrolyte solution to prepare the main sealing member 56.

The display substrate 60a was placed on top of the counter substrate 60b such that the display electrode 53a properly faced the counter electrode 53b, thus forming an empty cell.

The empty cell was filled with an electrolyte solution containing fine particles under vacuum. The electrolyte solution may be a NaOH solution, a liquid salt, or a solvent, such as acetonitrile. A NaOH solution was used in the present embodiment.

An electrolyte solution inlet was sealed with an end sealant. Thus, an electrochromic display according to the third embodiment was completed.

FIG. 2D is a schematic cross-sectional view of the electrochromic display according to the third embodiment. The electrochromic display according to the third embodiment includes the display substrate 60a and the counter substrate 60b, which are parallel to each other, and a color-developing layer 63 disposed between the substrates 60a and 60b. The color-developing layer 63 includes the electrochromic layer 61a and an electrolyte solution layer 62. The color-developing layer 63 contains an electrochromic material.

The display substrate 60a includes the glass substrate 51a, the display electrode 53a disposed on the glass substrate 51a, and the SiO₂ film (insulating film) 54a. The SiO₂ film 54a is disposed on at least a portion of a layered structure of the display electrode 53a and the electrochromic layer 61a. The SiO₂ film 54a is also disposed in a region of the glass substrate 51a in which the display electrode 53a is not disposed in a region surrounded by the sealing member 56.

The counter substrate 60b includes the glass substrate 51b and the counter electrode 53b disposed on the glass substrate 51b.

The color-developing layer 55 is disposed in the region surrounded by the sealing member 56 between the display substrate 60a and the counter substrate 60b. Upon the application of a voltage between the substrates 60a and 60b (the display electrode 53a and the counter electrode 53b), the color-developing layer 63 develops a color on the side of the display substrate 60a (the display electrode 53a).

The electrode patterns of the display electrode 53a and the counter electrode 53b and the pattern of the SiO₂ film 54a above the display electrode 53a are the same as in the first embodiment illustrated in FIG. 1D. In the third embodiment, the electrochromic layer 61a on the display electrode 53a has the same pattern as the display electrode 53a.

As in the first embodiment, a display region 59 on the display electrode 53a has a letter (numeric character) "1". As viewed from the top (as viewed in the direction of a normal line of the substrates 60a and 60b), a portion of the display electrode 53a other than the display region 59 and the lead terminal 58a is covered with the SiO₂ film 54a. Thus, the display electrode 53a except for the display region 59 in the region surrounded by the sealing member 56 is covered with the SiO₂ film 54a with the electrochromic layer 61a interposed therebetween. In other words, the display region 59 is decided as non-formed region of the SiO₂ film 54a on the display electrode 53a in the region surrounded by the sealing member 56. The display region 59 has the shape of an image to be displayed. Upon the application of a voltage between the display substrate 60a and the counter substrate 60b (the display electrode 53a and the counter electrode 53b), the electrochromic display according to the third embodiment can also display the character "1" due to the color development of the color-developing layer 63.

The present inventors checked the display performance of the electrochromic display according to the third embodiment. A region on the electrodes 53a and 53b disposed on the substrates 60a and 60b and not covered with the SiO₂ film 54a as viewed from the top, that is, the display region 59 having a letter (numeric character) "1" was substantially transparent in the absence of a DC voltage and developed a blue color upon the application of a DC voltage. The blue color was deepened as the applied voltage was increased.

Figure 3:
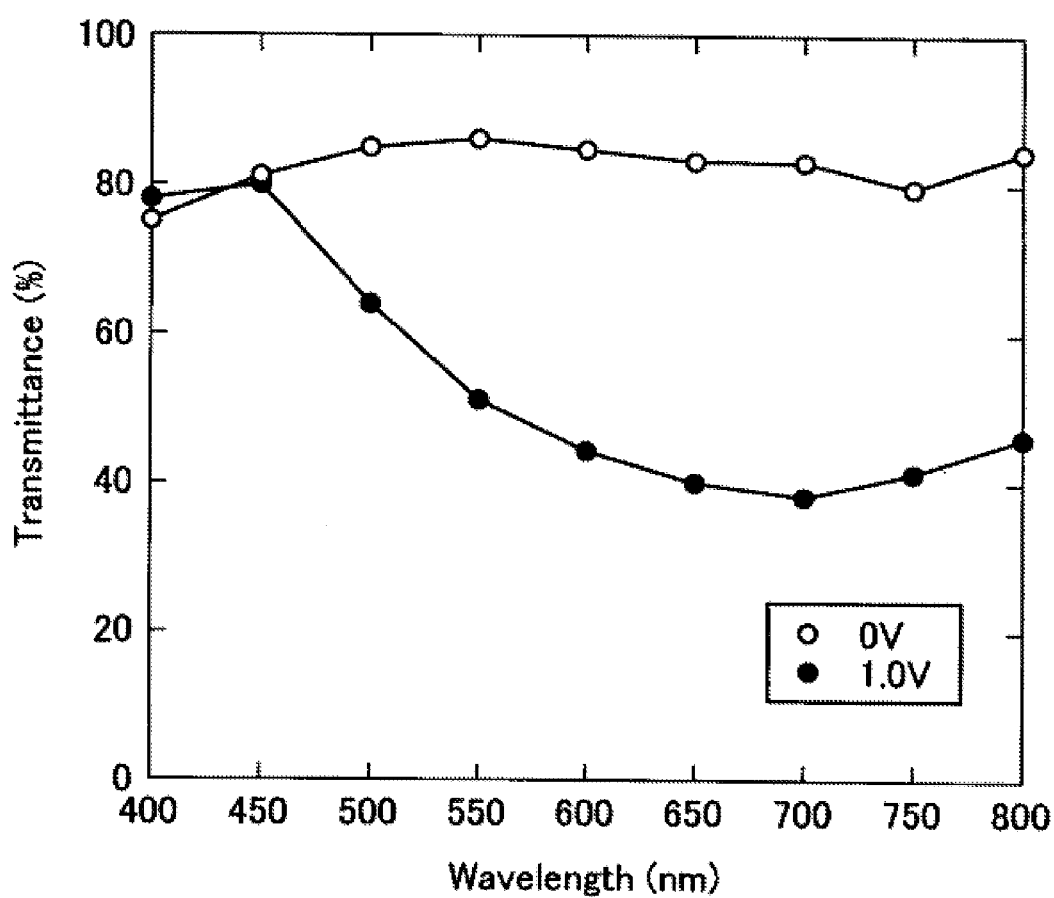
FIG. 3 is a graph showing the dependence of light transmittance on wavelength in a display region.

FIG. 3 is a graph showing the dependence of light transmittance on wavelength in a display region 59. The horizontal axis indicates wavelength in "nm", and the vertical axis indicates light transmittance in "%". A curved line passing through open circles indicates the dependence of light transmittance on wavelength in the absence of a voltage. A curved line passing through filled circles indicates the dependence of light transmittance on wavelength in the presence of a DC voltage of 1.0 V. In the presence of a DC voltage of 1.0 V, the light transmittance decreased in a longer wavelength range than a blue wavelength range, indicating the development of a blue color.

The present inventors found that the electrochromic display according to the third embodiment has an optical memory function. The colored state of the electrochromic display according to the third embodiment induced by the application of a voltage lasted for a relatively long period, more specifically, approximately two weeks. This period depends on the materials and manufacturing conditions. The colored state can be cancelled (returned to a transparent state)

upon the application of a DC voltage in the reverse direction. The electrochromic display according to the third embodiment became transparent upon the application of a DC voltage of −0.5 V. The transparent state lasts semipermanently unless a voltage is applied.

In the electrochromic display according to the third embodiment, only a region of the electrochromic layer 61a in direct contact with the electrolyte solution layer 62, that is, the display region 59 developed the blue color, and the other region (the region covered with the SiO$_2$ film 54a) did not cause coloration and decoloration. Variations in color density were not observed in the vicinity of the edge of the display region 59 (in the vicinity of the boundary between the region covered with the SiO$_2$ film 54a and the region not covered with the SiO$_2$ film 54a) or in the display region 59. As in the first and second embodiments, the electrochromic display according to the third embodiment also includes a non-display region and a display region corresponding to regions on which the SiO$_2$ film (insulating film) 54a is formed and not formed, respectively, and can produce high-quality images.

Although the insulating film was the SiO$_2$ film in the third embodiment, the insulating film may be an organic insulating film.

The electrochromic displays according to the first to third embodiments can produce high-quality images without blurring while uneven color development is reduced, for example, at pixel edges. Since the insulating film is formed, for example, on or above the lead wire for the display electrode, the width of the lead wire is not limited, and it is not necessary to route the lead wire so as to avoid the interference (overlap) with the electrode pattern on the counter substrate or complement the line width. Thus, a sufficient electric current can be supplied to pixels distant from the lead terminal, and variations in driving voltage or color density in each pixel or line can be reduced. Furthermore, since the lead resistance can be reduced, the display electrode and the counter electrode can be transparent electrodes, such as ITO electrodes. Thus, not only with a reflective display but also with a transmissive display or a transflective display, suitable displays can be realized.

While the present invention has been described with the embodiments, the present invention is not limited to these embodiments.

For example, an electrochromic display may include a plurality of electrically independent (separated) display electrodes having different shapes of images to be displayed (the shape of a display region) and having different lead terminals and perform static driving or duty driving (passive matrix driving).

The area of a region not covered with the insulating film in the region surrounded by the sealing member 56 may be more than 0% and 50% or less of the area of the region surrounded by the sealing member 56. More specifically, the area of the character display region 59 illustrated in FIG. 1D is in the range of 30% to 40% of the area of the region surrounded by the sealing member 56. When the total area of a display region not covered with an insulating film in the electrode pattern of a non-dot-matrix display, such as a segment display or a character display, is in the range of 10% to 50% of the area of the region surrounded by the sealing member 56, the display pattern of the non-dot-matrix display can be displayed at a satisfactory contrast, resulting in improved display quality.

A person skilled in the art will recognize that various modifications, improvements, and combinations can be made in the embodiments.

For example, the present invention can be applied to general passive matrix displays. The present invention can also be applied to general display products that require low power consumption, wide viewing angle characteristics, and low cost. The present invention can be applied to general reflective, transmissive, and projection displays, such as displays for power-saving information appliances (such as personal computers and personal digital assistants) that do not require frequent rewriting. The present invention can also be applied to information displays of magnetically or electrically recorded cards, toys for children, electronic paper, display devices for household electrical appliances, and onboard display devices.

What are claimed are:

1. An electrochromic display, comprising:
    a display substrate, which includes at least one display electrode on a first substrate and an insulating film;
    a counter substrate having a counter electrode on a second substrate, the counter electrode facing the at least one display electrode with the insulating film disposed on at least a portion of the at least one display electrode; and
    a color-developing layer containing an electrochromic material disposed in a region surrounded by a sealing member between the display substrate and the counter substrate,
    wherein the insulating film has a predetermined shape such that a region where the insulating film is disposed is a non-display region of the at least one display electrode, and a region surrounded by the sealing member where the insulating film is not disposed is a display region of the at least one display electrode.

2. The electrochromic display according to claim 1, wherein the insulating film covers an entire portion of the first substrate on which no display electrode is disposed in the region surrounded by the sealing member.

3. The electrochromic display according to claim 1, wherein an area of the region surrounded by the sealing member where the insulating film is not disposed is more than 0% and at most 50% of a total area of the region surrounded by the sealing member.

4. The electrochromic display according to claim 1, wherein:
    the at least one display electrode comprises a plurality of display electrodes;
    each of the plurality of display electrodes has a display region of a shape different from display regions of the other display electrodes;
    the plurality of display electrodes are electrically independent from each other; and
    each of the plurality of display electrodes performs static driving or duty driving.

5. The electrochromic display according to claim 1, wherein another insulating film is disposed on a portion of the counter electrode in the region surrounded by the sealing member except a portion of the counter electrode facing the display region of the at least one display electrode.

* * * * *